United States Patent [19]

Rönndahl

[11] Patent Number: 4,835,406

[45] Date of Patent: May 30, 1989

[54] SWITCHING DEVICE

[76] Inventor: Sylve Rönndahl, Drevstagatan 3, S-681 00 Kristinehamn, Sweden

[21] Appl. No.: 8,001

[22] Filed: Jan. 29, 1987

Related U.S. Application Data

[63] Continuation-in-part of Ser. No. 06/887,930, Jun. 27, 1986, abandoned.

[30] Foreign Application Priority Data

Oct. 29, 1984 [SE] Sweden ................................ 8405396

[51] Int. Cl.[4] .............................................. B62D 45/00

[52] U.S. Cl. ..................................... 315/83; 307/10.8; 307/112

[58] Field of Search ................. 307/10 R, 10 LS, 112; 315/82, 83, 84, 77, 79, 80; 340/76, 79, 92; 200/61.43, 61.44, 61.45, 61.30, 61.54; 362/61, 62, 211, 212; 339/17 LC, 10, 75 R, 75 M, 75 P, 31 R, 31 L, 32 R, 32 M, 111, 149, 150 R, 154 R, 176 R, 143 T, 143 R, 94 R, 155 T, 168, 169, 170, 176 R, 176 L, 195 R, 195 L, 182 R, 182 L, 217 TP, 217 S, 217 R, 217 PS

[56] References Cited

U.S. PATENT DOCUMENTS

| | | | |
|---|---|---|---|
| 2,934,744 | 4/1960 | Schutte | 340/76 |
| 2,945,967 | 7/1960 | Medoff | 307/112 |
| 2,948,832 | 8/1960 | Hollins | 315/82 |
| 3,028,523 | 4/1962 | Seid | 339/182 L X |
| 3,028,525 | 4/1962 | Morton | 339/182 L X |
| 3,201,617 | 8/1965 | Pacoroni et al. | 339/154 R X |
| 3,305,695 | 2/1967 | Late | 340/76 X |
| 3,368,110 | 2/1968 | Taylor | 307/112 |
| 3,452,252 | 6/1969 | Mapham | 307/112 |
| 3,484,864 | 12/1969 | Bernstein et al. | 307/112 |
| 3,559,165 | 1/1971 | Kleemann | 340/76 X |
| 3,671,802 | 6/1972 | Ballou | 315/83 X |
| 3,678,366 | 7/1972 | Tharman | 307/150 X |
| 3,723,721 | 3/1973 | Weber | 315/82 |
| 3,832,597 | 8/1974 | Mitchell | 307/10 LS X |
| 3,883,710 | 5/1975 | Hanssen et al. | 315/83 X |
| 4,006,453 | 2/1977 | Bryant | 307/10 LS X |
| 4,020,457 | 4/1977 | Neuffer | 307/10 LS X |
| 4,105,898 | 8/1978 | Farler et al. | 307/10 LS |
| 4,484,185 | 11/1984 | Graves | 339/75 P X |
| 4,495,444 | 1/1985 | Thomas | 315/82 |
| 4,500,160 | 2/1985 | Bertsch | 339/17 LC X |

*Primary Examiner*—William M. Shoop, Jr.
*Assistant Examiner*—Paul Ip
*Attorney, Agent, or Firm*—Dennison, Meserole, Pollack & Scheiner

[57] ABSTRACT

A plug in circuit component is provided for switching headlights of vehicles such as automobiles between two positions; full beam and half beam. When the headlight is switched from low to high beam, the low beam disappears in conventional systems, however with the present invention the low beam remains illuminated even when the high beam setting is on and this is accomplished preferably by the use of a diode in the device.

4 Claims, 2 Drawing Sheets

SWITCHING DEVICE

CROSS REFERENCE TO RELATED APPLICATIONS

The present application is a continuation in part of application Ser. No. 06/882,930, filed June 27, 1986, now abandoned.

BACKGROUND OF THE INVENTION

The present invention relates broadly to automotive lighting systems and specifically to means for switching between light settings on vehicles such as automobiles, trucks, and the like. When driving after dark on highly traveled roadways and highways, the vehicle driver will frequently be required to switch from high to low beam when another vehicle approaches from the opposite direction. Using conventional systems, when the high beam is switched on again, the low beam disappears.

SUMMARY OF THE INVENTION

The present invention provides a circuit component means to enable the low beam to remain on even when the high beam is illuminated. This results in the light cone emitting from both high and low beams to illuminate the road simultaneously, thus providing a more intense light. Further, the use of this invention extends the total beam since the light cones for the low beam and high beam also normally have different contours and thus supplement each other to provide the best possible field of vision during night driving In order to draw a clear distinction between conventional separate low and high beam operation the term "full beam" will be employed here to describe the combined operation of the low and high beams while the term half beam will be used to describe low beam operation only.

In accordance with my invention, the coordination of half and full beam is acheived by arranging a current control such as a diode in the circuit for the lighting system between the lamp and the power cable.

The diode of the invention is preferably connected in the cable leading from the switch device or in the light switch itself. Alternatively, a relay, or the bulb may be provided with a diode. The diode is connected in such a way that at half beam settings, only the filaments for the low beam will supply light but at high beam settings, the filaments for both full beam and low beam will supply light. As an alternative to the diode, current may be supplied to the resistance wires for low beam setting by means of a current conducting element such as a cable, while the high beam is also connected. The cable is preferably connected into the electrical system via the current switch or via the fuse box.

The invention has been described above with reference to a light switch on transport vehicles, preferably automobiles, but the invention may also be employed in other applications where the light setting may assume alternative positions.

A preferred embodiment of the invention is shown in the accompanying description and drawings.

DESCRIPTION OF THE PREFERRED EMBODIMENTS

Figure 1:
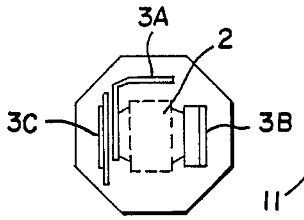
FIG. 1 is an end view of the circuit device of the invention.
Figure 2:
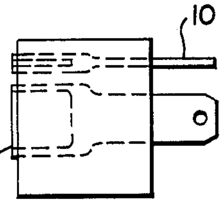
FIG. 2 is a side elevation of the invention.
Figure 3:
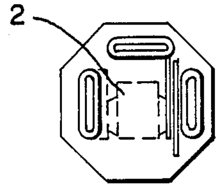
FIG. 3 is an end view taken from the left of FIG. 2.
Figure 4:
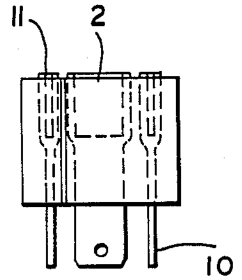
FIG. 4 is a side elevation similar to FIG. 2 but showing the side of the device looking upwardly in FIG. 1.
Figure 5:
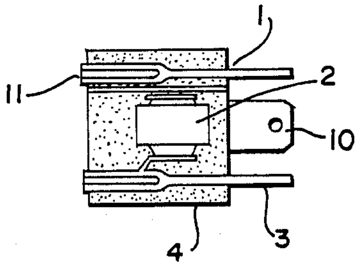
FIG. 5 is a sectional view of the circuit device.

Referring to the drawings, wherein like reference characters describe similar parts, the switching component is shown broadly at 1 and includes a diode 2 which for example could be a standard number 8327, 40HF40 or other similar device. Three flat plugs 3 are set in a plastic body 4 which encapsulates both the diode 2 and the plugs. One end of each plug constitutes a male projection as shown at 10 and the opposite end is bifurcated to provide a receptable 11 for reception of a male plug member.

The plug members 3_a_ and 3_b_, as seen best in FIG. 1, are connected to opposite sides of the diode, however plug member 3_c_ is not so connected. It is to this free plug 3_c_ that one end of each bulb filament is connected (both low beam and high beam filaments). The other ends of the filaments are connected to the remaining plugs.

In use, the high beam filament is isolated when half beam is selected by the driver since the diode 2 serves to block current flow.

Figure 6:
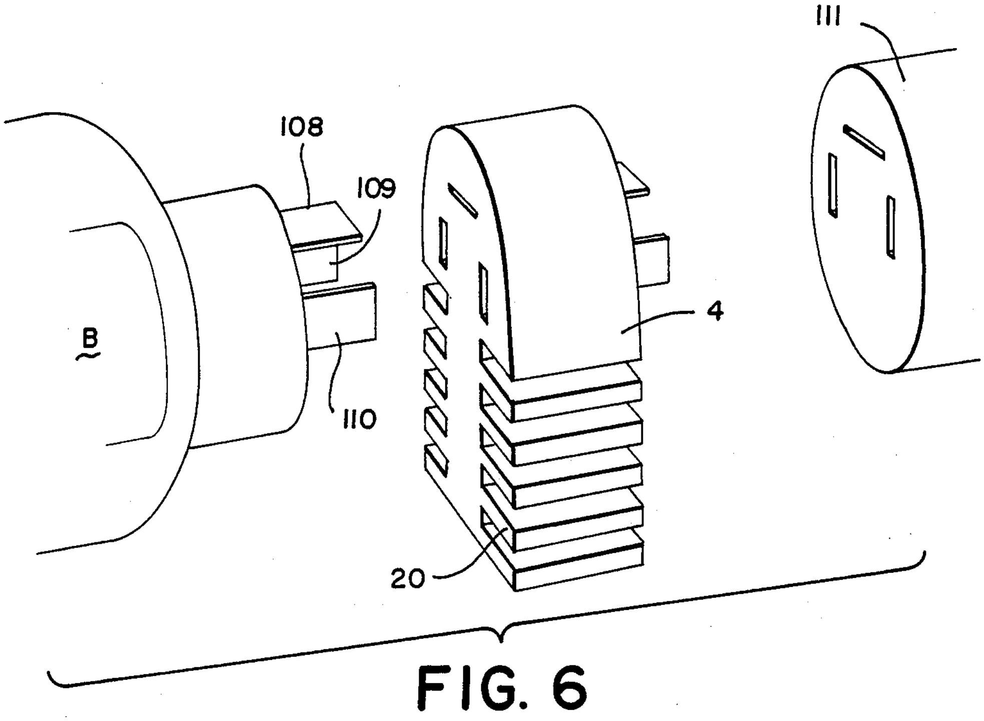
FIG. 6 is a perspective view of a first modified form of the invention.
Figure 7:
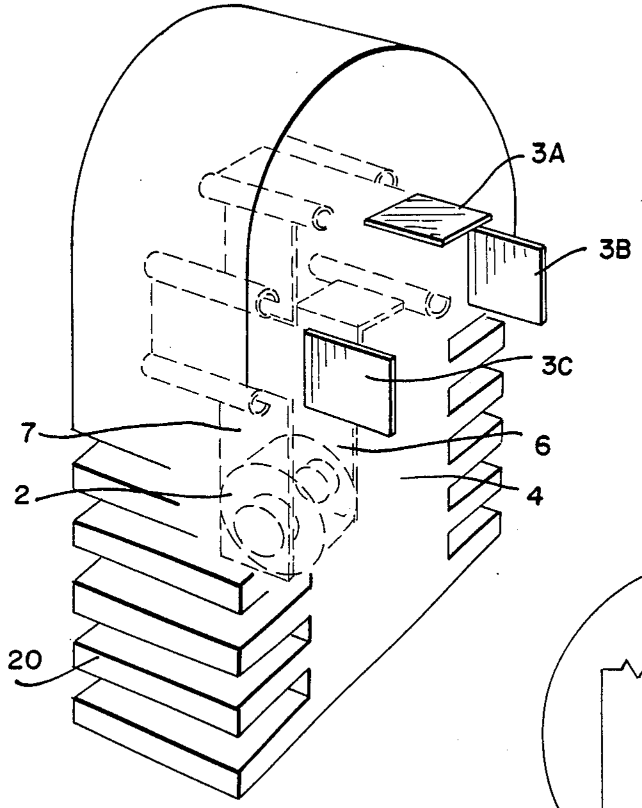
FIG. 7 is a perspective showing the form of the invention in FIG. 6 in conjunction with the vehicle light bulb and the connecting cable.

The device 1 is adapted to be connected in the bulb circuit in the manner as shown in FIGS. 6 and 7 which generally depict a form of the invention more adaptable to international usage.

It will be seen that the automotive headlight bulb B has male projections 108, 109 and 110 which will fit into the female bifurcated end connectors 11 of the blade members 3. The male members 3 of the device of the invention are adapted to fit within the receptacle 111 which goes to the electrical power source of the vehicle, conventionally a 12 volt d.c. supply, and appropriate switching and fusing means. It will be noted that the device 1 is connected in series between the power supply and the illumination means or bulb B.

Figure 8:
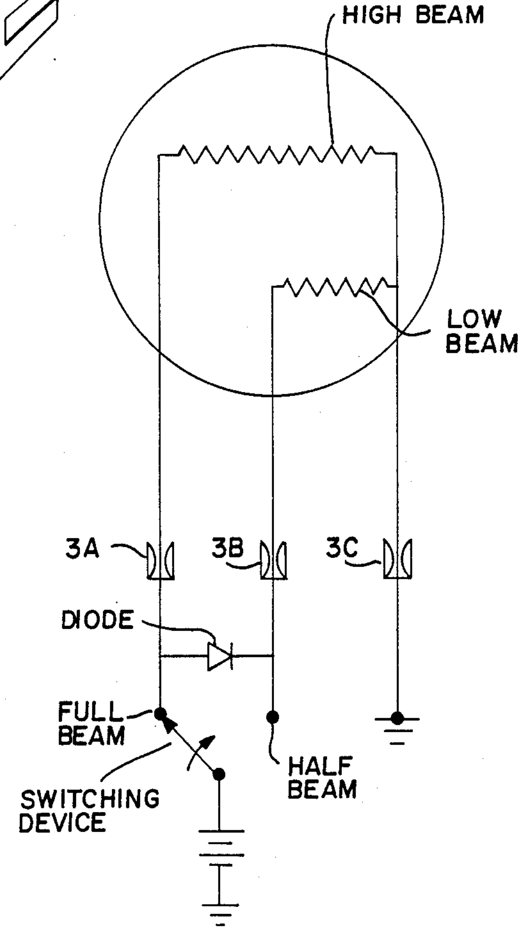
FIG. 8 is an electrical schematic of the circuit device.

FIG. 8 is an electrical schematic illustrating operation of the switching device pictorially shown in FIGS. 1–7. When the driver selects the full beam position the high beam filament is directly energized and the low beam filament is energized through the diode. In the half beam position, the high beam filament is blocked by the diode and the low beam filament only is energized.

If desired, the plastic body may be provided with integral cooling fins 20 as shown in FIGS. 6 and 7 to dissipate heat from the diode.

I claim:

1. A switching device for switching between a half beam and a full beam setting in a lamp circuit, such as a vehicle headlight and wherein said lamp circuit includes a lamp means having a low beam filament and a high beam filament, said filaments having a common terminal and two feed terminals, said device being in series between a direct current power supply and said lamp means and including a diode connected between said feed terminals, whereby in the full beam setting both the low beam and the high beam filaments are supplied with electrical current, but in the half beam setting, current is blocked from the high beam filament by said diode.

2. A switching device as set forth in claim 1, and further including an insulated housing encapsulating said diode and three plug members having male portions extending from said housing for insertion into a power cable and female portions on the opposite end therefrom for connection to a lamp.

3. A switching device as defined in claim 2, wherein said insulated housing is provided with heat dissipating fins.

4. A switching device as defined in claim 2 wherein said diode is connected between two of said plug members.

* * * * *